United States Patent [19]

Latassa et al.

[11] 4,347,460

[45] Aug. 31, 1982

[54] COMPACT FLUORESCENT LAMP ASSEMBLY

[75] Inventors: Frank M. Latassa, Magnolia; John G. Ray, Topsfield, both of Mass.

[73] Assignee: GTE Products Corporation, Stamford, Conn.

[21] Appl. No.: 126,818

[22] Filed: Mar. 3, 1980

[51] Int. Cl.³ ........................ H01J 25/50; H01J 13/46; H01J 19/78; H01K 1/62

[52] U.S. Cl. ...................................... 315/63; 313/204; 313/493; 315/57; 339/206 L; 339/210 T; 339/170; 339/50 R; 339/119 L

[58] Field of Search ........................... 315/57, 63, 100; 313/204, 493; 339/50, 51, 119 L, 206 L, 210 T, 170, 63, 196; 362/362

[56] References Cited

U.S. PATENT DOCUMENTS

| | | | |
|---|---|---|---|
| 2,278,079 | 3/1942 | Knouse et al. | 315/49 |
| 2,298,961 | 10/1942 | Miller | 339/50 C X |
| 2,349,255 | 5/1944 | Epstein | 339/50 X |
| 3,551,736 | 12/1970 | Doehner | 315/100 |
| 3,568,132 | 3/1971 | Johnson | 339/50 |
| 3,745,409 | 7/1973 | Netten | 315/100 |
| 3,752,977 | 8/1973 | Davis | 339/119 L |
| 3,914,646 | 10/1975 | Paupy | 315/100 |
| 4,173,730 | 11/1979 | Young et al. | 313/204 |
| 4,208,604 | 6/1980 | Couwenberg | 313/493 |
| 4,258,287 | 3/1981 | Hetzel | 339/50 C |
| 4,260,931 | 4/1981 | Wesselink et al. | 313/493 |

FOREIGN PATENT DOCUMENTS

| | | | |
|---|---|---|---|
| 49-28294 | 8/1974 | Japan | 313/493 |
| 49-28295 | 8/1974 | Japan | 313/493 |

*Primary Examiner*—Saxfield Chatmon, Jr.
*Attorney, Agent, or Firm*—William H. McNeill

[57] ABSTRACT

A compact flourescent lamp assembly includes a triple bend lamp and a first housing including a ballast and a screw-in base for use with an incandescent fixture. A second housing, attached to the lamp, includes a glow switch and starting capacitor. The triple bend lamp is fabricated from a previously completed elongate lamp.

7 Claims, 14 Drawing Figures

54 56 38 24 40 42 32 34 22 28

54
56
38
20
24
40
42

32
34
22
28

38
24
40
52
42

24
38

38
24
20
22
28 x
48
44

50
46

52

≈ x/2
58
50
60

≈ x/4
52
54
50

56
PLANE OF PRIMARY "U" SHAPED BEND

PARALLEL PLANES OF
SECONDARY "U" SHAPED BENDS

COMPACT FLUORESCENT LAMP ASSEMBLY

TECHNICAL FIELD

This invention relates to fluorescent lamps and more particularly to compact lamps of this type which may be employed with incandescent fixtures.

BACKGROUND ART

Fluorescent lamps are known electric discharge sources in which light is predominantly produced by fluorescent powders activated by ultraviolet energy generated by a mercury arc. The lamps, usually in the form of a long tubular bulb with an electrode sealed into each end, contain mercury vapor at low pressure with a small amount of inert gas, principally argon, for starting. The inner walls of the bulb are coated with light emitting phosphors. When the proper voltage is applied an arc is produced by current flowing between the electrodes through the mercury vapor. The discharge generates some visible radiation, or light, but mostly invisible ultraviolet radiation. The ultraviolet in turn excites the phosphors to emit light.

While fluorescent lamps have long been known for their high luminous efficacy (i.e., their light output is high relative to the power consumed) their use as home lighting sources has been overshadowed by the relatively inefficient incandescent bulb. Primarily, this situation has arisen because of the inconvenient shape and size of the typical fluorescent bulb (long, tubular, and awkward to handle) and the fact that auxiliary circuitry, such as starting systems and ballast, are necessary for their operation.

In these days of soaring energy costs it would be an advance in the art to provide a fluorescent light source that is compact in design, easy to use and replace and compatible with incandescent fixtures.

DISCLOSURE OF INVENTION

Accordingly, it is an object of the invention to obviate the disadvantages of the prior art.

Yet another object of the invention is the provision of a compact, easy to use fluorescent light source compatible with typical incandescent fixtures.

These objects are accomplished in one aspect of the invention by a fluorescent lamp assembly for use with an incandescent fixture. The assembly comprises a first housing containing a ballast and having a screw-in, incandescent type male base projecting from one surface thereof and lamp contact receiving means on another surface thereof. A second housing includes lamp starting means and a fluorescent lamp having a given effective length projecting therefrom. Also included are lamp contacts formed to mate with the contact receiving means in the first housing.

In a preferred embodiment of the invention the fluorescent lamp is configured by multiple bends to have an overall height that is approximately $\frac{1}{4}$ of its effective length, thus providing a compact source comparable in size to a typical incandescent bulb.

The fluorescent bulb in compact shape is formed by bending a phosphor coated, elongate bulb, first in a primary "U" shape lying in a first plane and then by bending the legs of "U" into secondary "U" shapes lying in parallel planes normal to the first plane.

BEST MODE FOR CARRYING OUT THE INVENTION

For a better understanding of the present invention, together with other and further objects, advantages and capabilities thereof, reference is made to the following disclosures and appended claims taken in conjunction with the above-described drawings.

Figure 5:
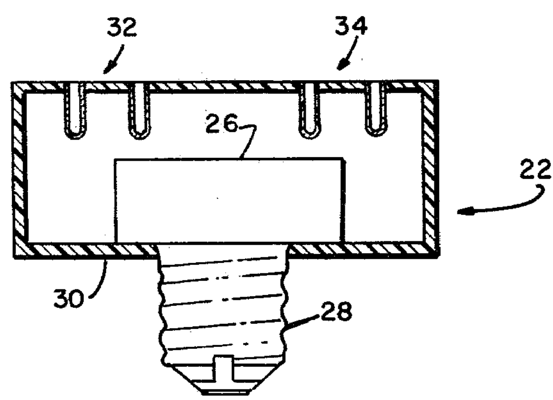
FIG. 5 is a sectional view of the first housing.
Figure 11:
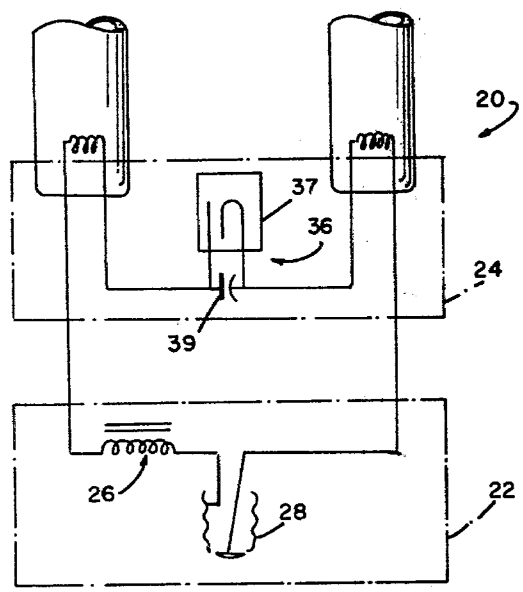
FIG. 11 is a circuit diagram of the electrical components of the lamp assembly.

Referring now to the drawings with greater particularity, there is shown in FIGS. 1-4 a fluorescent lamp assembly 20 comprising a first housing 22 and a second housing or lamp base 24. The first housing 22 is formed of an electrically insulating material and contains therewithin a fluorescent lamp ballast 26 (see FIG. 5) which can be a 25 watt choke coil suitably electrically connected (see FIG. 11). A suitable choke coil is available from the General Electric Co. under designation 6G1042. First housing 22 is also provided with a screw-in, incandescent type base 28 which projects from a surface 30 thereof and further contains lamp contact receiving means 32 and 34, which, as shown, each comprises a pair of apertures for receiving bipin lamp contacts, it being understood that these specific contacts are exemplary only.

Figure 1:
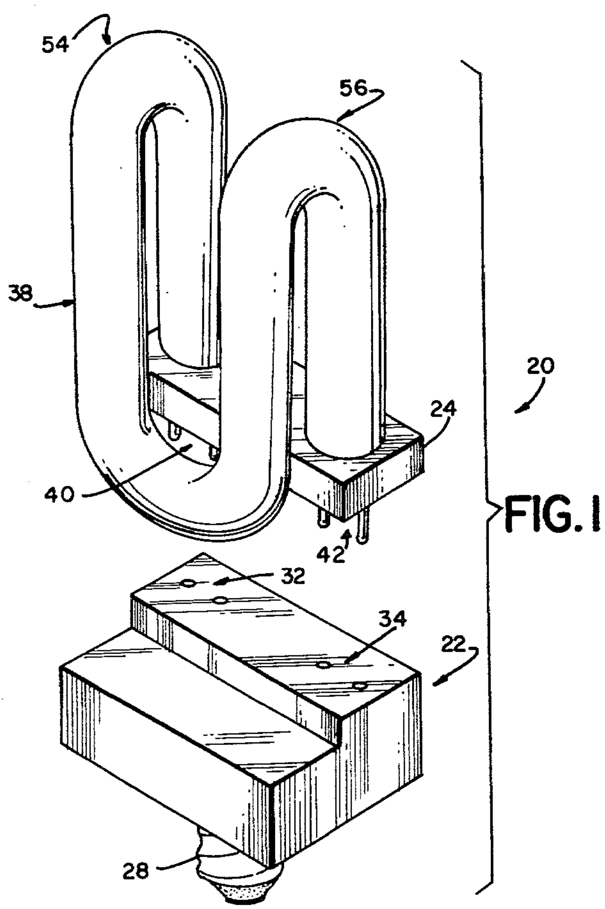
FIG. 1 is an exploded, perspective view of one embodiment of the invention.
Figure 2:
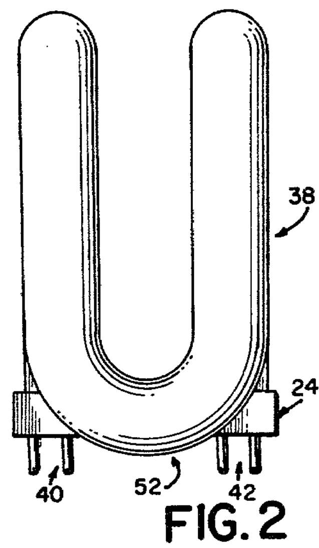
FIG. 2 is a front elevational view thereof.
Figure 4:
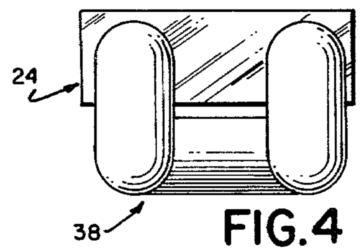
FIG. 4 is a plan view thereof.
Figure 3:
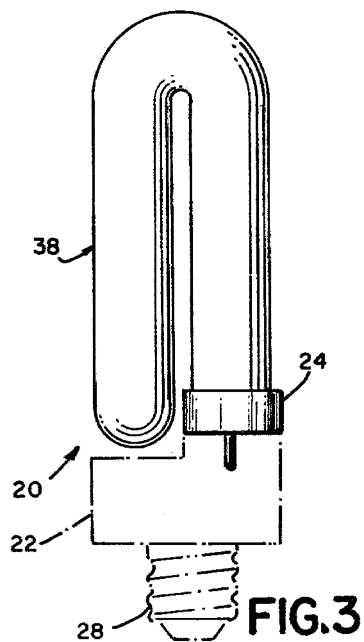
FIG. 3 is a side elevational view thereof.
Figure 6:
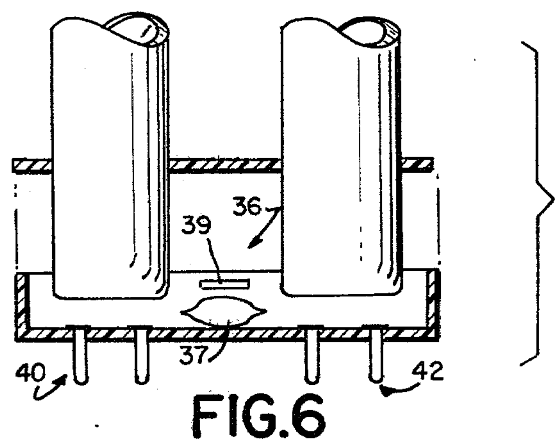
FIG. 6 is a sectional view of the second housing.

The second housing 24 (see FIG. 6) contains lamp starting means 36 which comprises a glow switch 37 and capacitor 39, suitably electrically connected, (see FIG. 11) and a compact fluorescent lamp 38 projecting therefrom. Also included with second housing 24 are lamp contacts 40 and 42 which mate with the lamp contact receiving means 32 and 34.

Figure 7:
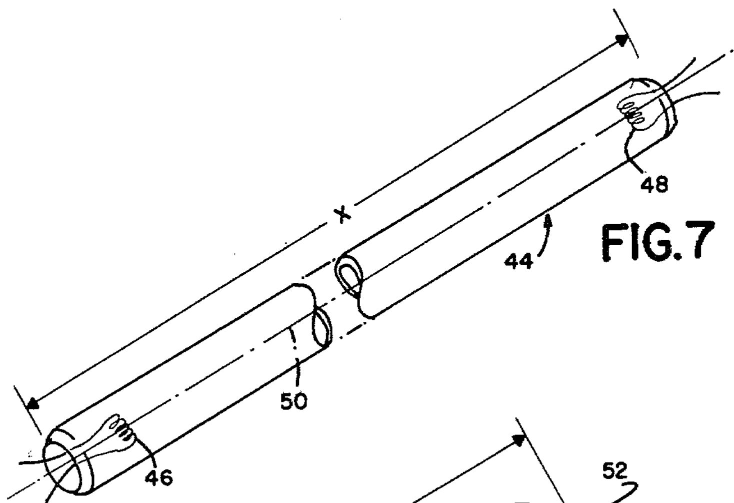
FIGS. 7-9 are diagrammatic, perspective representations of sequential steps in the process of forming the compact bulb.

Lamp 38 is formed from a conventional, elongate fluorescent lamp such as is shown at 44 (FIG. 7). The lamp 44 comprises a glass envelope, phosphor coating and electrodes 46, 48 sealed in the ends as is conventional, and has an effective length x. Preferably, the lamp has a fill gas composed of 75% krypton and 25% argon so as to produce a lamp voltage low enough to operate satisfactorily on the 25 watt choke 26.

Figure 8:
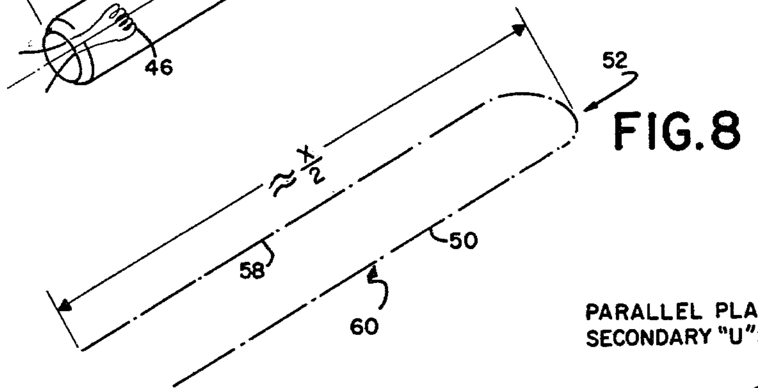
Figure 9:
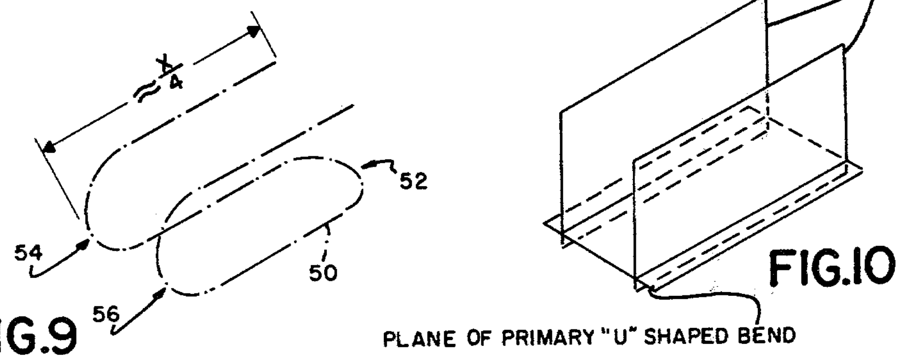

FIGS. 8 and 9 illustrate the forming operations necessary to make compact lamp 38 from elongate lamp 44. In the interest of clarity and simplicity only the centerline 50 of the lamp is shown. As can be seen from FIG. 8, the first step in the operation forms the primary "U" shaped bend 52. This leaves a lamp having an overall length approximately equal to x/2.

Figure 10:
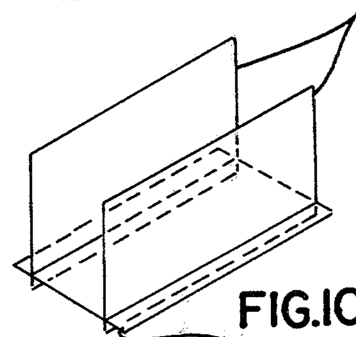
FIG. 10 is a diagrammatic illustrations of the planes of the bulb.

The second step in the operation involves forming secondary "U" shaped bends 54 and 56 in the legs 58 and 60. As can be seen from FIGS. 1 and 9, the secondary "U" shaped bends are parallel to one another and lie in planes that are normal to the plane of the primary "U" shaped bend. These planes are diagrammatically illustrated in FIG. 10.

This triple folding or bending operation thus produces a lamp having an overall height, not including the pins, of approximately x/4 from an elongate lamp having an effective length x. That is, a typical T6 lamp having an arc length of 16 inches becomes a compact lamp with the same arc length (and light output) with an overall height of about 4½ inches. The width of the lamp can be 2½ inches and the depth 1¾ inches, these dimensions comparing favorably with those of incandescent bulbs.

After the bending operations have been completed the second housing 24, which also functions as the lamp base, is attached to the terminal ends of the lamp and the appropriate electrical connections are made. The lamp assembly 20 described above obviates many of the disadvantages of the prior art. It provides a compact, efficient fluorescent light source which can be employed in incandescent lamp fixtures, such as conventional table lamps. It is economical to fabricate on existing equipment since the elongate lamp 44 can be phosphor coated and have the mounts sealed therein before the bending operations take place to form the lamp 38. Preferably, air is pumped into the lamp during the bending operation to keep the bends from collapsing. After bending the exhausting, gas filling, mercury addition, etc. take place. And, furthermore, the lamp assembly conveniently handles the extra circuitry required for the fluorescent lamp.

Figure 12:
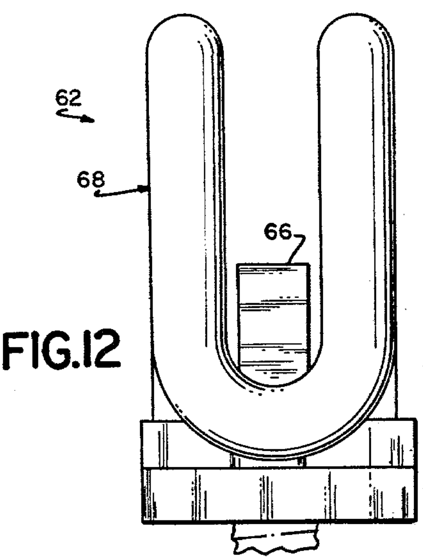
FIG. 12 is a front elevational view of an alternate embodiment of the invention.
Figure 13:
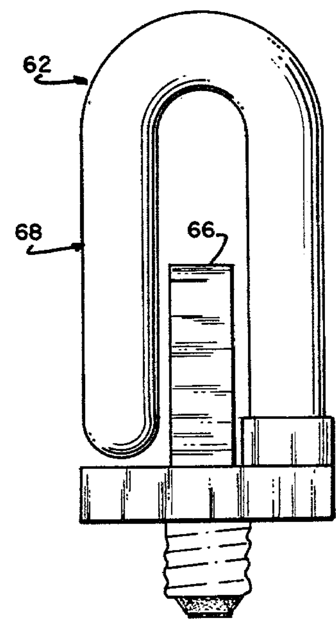
FIG. 13 is a side elevational view thereof.
Figure 14:
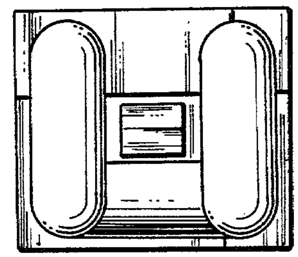
FIG. 14 is a plan view thereof.

Various modifications of the basic design are also possible. For example, FIGS. 12–14 show a lamp assembly 62 wherein the housing 64 is modified to provide a vertically extending choke coil 66 which fits between the legs of the lamp 68. This modification allows a further reduction in the overall height of the lamp assembly 62 by reducing the height of the housing 64 relative to housing 22.

While there have been shown and described what are at present considered to be the preferred embodiments of the invention, it will be apparent to those skilled in the art that various changes and modifications can be made herein without departing from the scope of the invention as defined by the appended claims.

We claim:

1. A fluorescent lamp assembly for use with an incandescent fixture, said assembly comprising:
- a first housing containing a ballast for said lamp and having a screw-in, incandescent type base projecting from one surface thereof and a pair of contact receiving means on another surface thereof; and
- a second housing including lamp starting means, a fluorescent lamp having a given effective length projecting therefrom and a pair of contacts for mating with said pair of contact receiving means.

2. The assembly of claim 1 wherein said lamp is provided with at least one primary "U" shaped bend.

3. The assembly of claim 2 wherein said lamp is provided with two secondary "U" shaped bends.

4. The assembly of claim 3 wherein said secondary "U" shaped bends are parallel to each other.

5. The assembly of claim 4 wherein said secondary "U" shaped bends are in planes normal to the plane of said primary "U" shaped bend.

6. The assembly of claim 5 wherein each of the legs formed by each "U" shaped bend comprises approximately ¼ of said given effective length of said lamp.

7. The assembly of claim 1 wherein said ballast includes a choke and said starting means includes a capacitor and a glow switch.

* * * * *